US 6,668,965 B2

(12) United States Patent
Strong

(10) Patent No.: US 6,668,965 B2
(45) Date of Patent: Dec. 30, 2003

(54) DOLLY WHEEL STEERING SYSTEM FOR A VEHICLE

(76) Inventor: Russell W. Strong, 410 S. Pitkin Rd., Craftsbury Common, VT (US) 05827

( * ) Notice: Subject to any disclaimer, the term of this patent is extended or adjusted under 35 U.S.C. 154(b) by 0 days.

(21) Appl. No.: 10/156,304

(22) Filed: May 28, 2002

(65) Prior Publication Data

US 2002/0175018 A1 Nov. 28, 2002

Related U.S. Application Data

(60) Provisional application No. 60/317,008, filed on Sep. 4, 2001, provisional application No. 60/293,873, filed on May 25, 2001, and provisional application No. 60/293,848, filed on May 25, 2001.

(51) Int. Cl.[7] ................................ B60T 1/00
(52) U.S. Cl. ................... 180/411; 188/1.12; 16/35 R
(58) Field of Search ................. 180/411, 412; 16/18 R, 35 R, 48, 25; 188/1.12, 82.84

(56) References Cited

U.S. PATENT DOCUMENTS

| | | | |
|---|---|---|---|
| 2,770,832 A | 11/1956 | Martin | |
| 3,479,049 A | 11/1969 | Duecy | |
| 3,518,714 A | 7/1970 | Hager | |
| 3,672,701 A | 6/1972 | Blank | |
| 3,817,548 A | 6/1974 | De Puydt et al. | |
| 3,924,292 A | 12/1975 | Christensen | |
| 4,078,821 A | 3/1978 | Kitterman | |
| 4,248,445 A | 2/1981 | Vassar | |
| 4,309,791 A * | 1/1982 | Aulik | 16/35 R |
| 4,349,938 A * | 9/1982 | Fontana | 16/35 R |
| 4,353,567 A | 10/1982 | Weldy | |
| 4,372,569 A | 2/1983 | Otterson | |
| 4,449,725 A | 5/1984 | Robison et al. | |
| 4,511,155 A | 4/1985 | Galloway | |
| 4,645,230 A | 2/1987 | Hammons | |
| 4,679,645 A * | 7/1987 | Galloway et al. | 180/65.8 |
| 4,685,174 A | 8/1987 | Hager | |
| 4,821,833 A | 4/1989 | Yamaguchi | |
| 4,834,412 A | 5/1989 | Trema | |
| 5,066,030 A | 11/1991 | Brett et al. | |
| 5,184,373 A | 2/1993 | Lange | |
| 5,228,522 A | 7/1993 | Stufflebeam et al. | |
| 5,503,416 A * | 4/1996 | Aoki et al. | 280/79.11 |
| 5,590,605 A | 1/1997 | Salter et al. | |
| 5,607,030 A | 3/1997 | Swift et al. | |
| 5,785,154 A | 7/1998 | Chen | |
| 5,797,611 A | 8/1998 | Joseph et al. | |
| 5,899,469 A * | 5/1999 | Pinto et al. | 280/79.11 |
| 6,029,779 A * | 2/2000 | Kunz | 188/1.12 |
| 6,050,008 A | 4/2000 | Doornek et al. | |
| 6,070,701 A | 6/2000 | Hu | |
| 6,234,507 B1 | 5/2001 | Dickie et al. | |
| 6,298,950 B1 * | 10/2001 | Oelrichs et al. | 188/20 |
| 6,302,421 B1 * | 10/2001 | Lee | 280/210 |

* cited by examiner

*Primary Examiner*—Kevin Hurley
*Assistant Examiner*—Tony Winner
(74) *Attorney, Agent, or Firm*—John S. Artz

(57) ABSTRACT

A. dolly wheel steering system includes a dolly wheel, a dolly wheel spindle in communication with the dolly wheel such that the dolly wheel and the dolly wheel spindle are fixedly secured to one another and are rotatable as a single unit. The dolly wheel spindle is in communication with a coupling device and a steering control system. The steering control system and the coupling device are each in communication with a controller to regulate actuation of each. When a signal from the controller requests utilization of steering control, the coupling device applies a restraining force to the dolly wheel spindle to limit free rotation of the dolly wheel. When the rotation of the dolly wheel spindle is thus restrained, the steering control system can effectuate direct steering control of the dolly wheels to provide precise directional control. When the control indicates the normal dolly wheel capability is desired, the restraining force applied to the dolly wheel spindle by the coupling device is relieved and the steering control system is overridden. The coupling device by its characteristics can provide varying resistance to free dolly wheel spindle rotation for restriction of dolly wheel shimmying and oscillation and where otherwise advantageous to reduce free rotation.

42 Claims, 7 Drawing Sheets

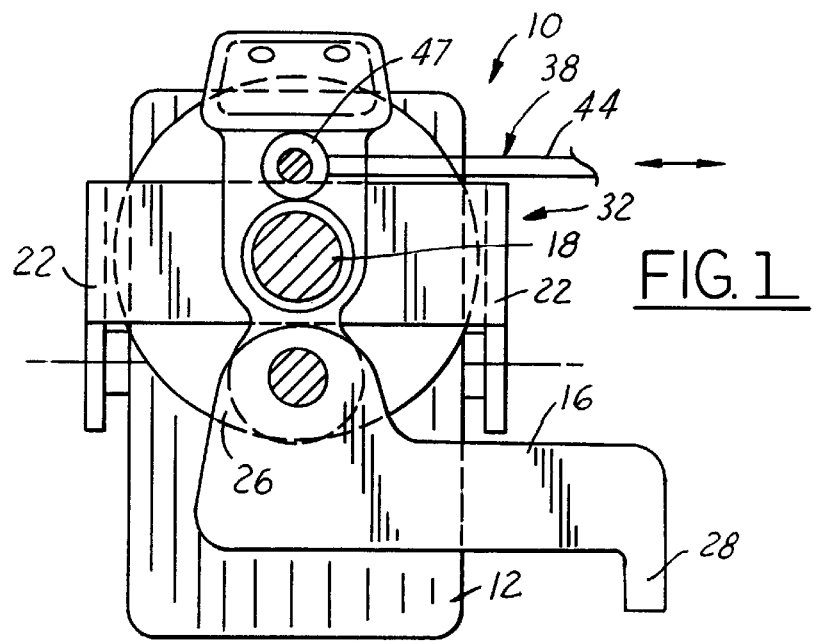
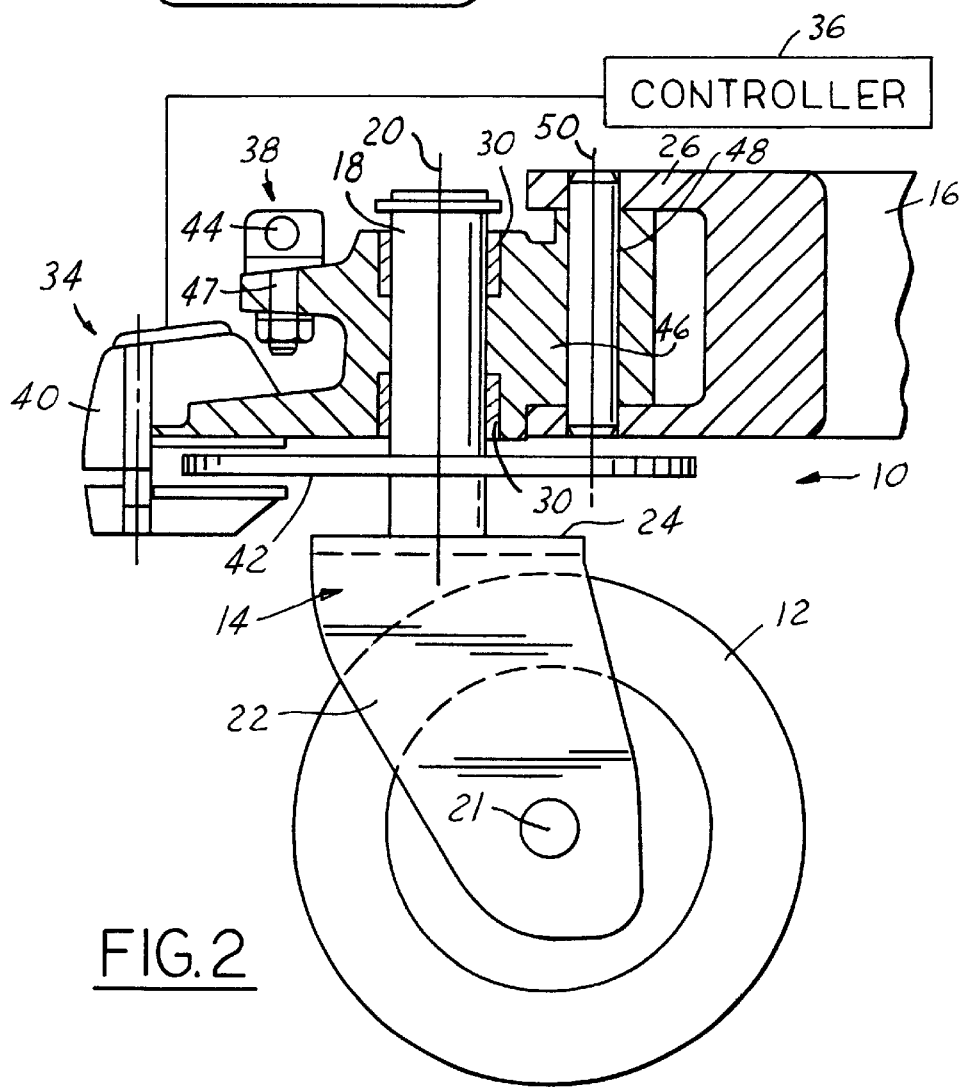

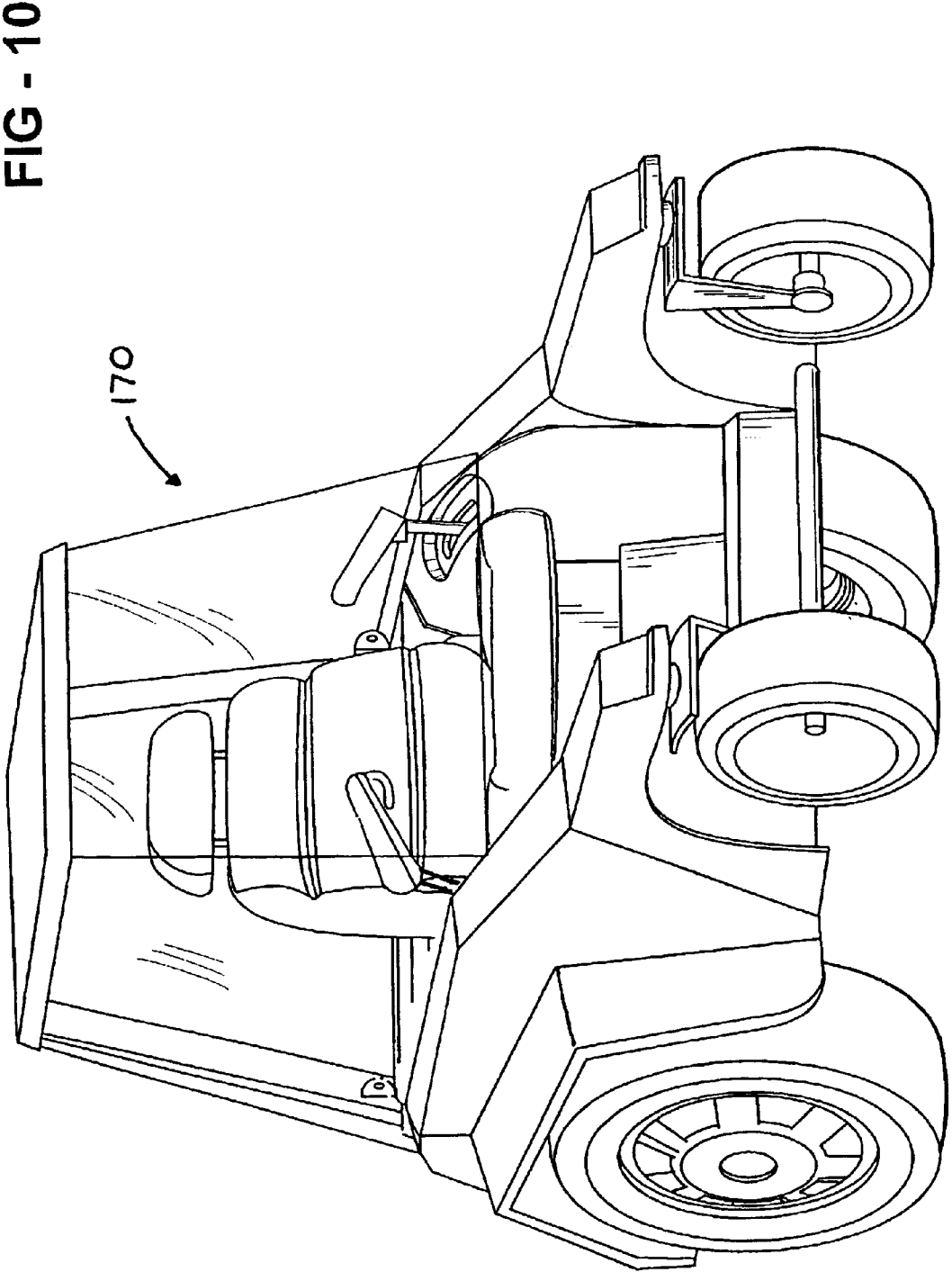

DOLLY WHEEL STEERING SYSTEM FOR A VEHICLE

CROSS-REFERENCE TO RELATED APPLICATIONS

The present invention claims priority from U.S. Provisional Application Serial No. 60/293,873, entitled "Dolly Wheel Steering System Employing Speed Related Dampening," filed May 25, 2001; U.S. Provisional Application Serial No. 60/293,848, entitled "Dual Mode Steering System For a Vehicle," filed May 25, 2001; and U.S. Provisional Application Serial No. 60/317,008, entitled "Personal Mobility Vehicle," filed Sep. 4, 2001.

TECHNICAL FIELD

The present invention relates generally to dolly wheels for use with a vehicle to provide maneuverability that results in what are termed zero turn capabilities. More specifically, the present invention relates to dolly wheels that have a steering control system that allows dolly wheel type response to steering at low speeds and in conditions where such dolly wheel effect is advantageous and precise directional control steering of the dolly wheels at high speeds and in conditions of variable traction of the vehicle and terrain as is also advantageous.

BACKGROUND OF THE INVENTION

Dolly wheels are commonly used on vehicles or other devices which operate at low speeds (0 –10 m.p.h.). However, when the speed of the vehicle increases, such as to 15 m.p.h. or greater, current dolly wheels can become unstable and oscillate or shimmy. The oscillation or shimmying is a phenomenon characterized by the vibration or rotation of the dolly wheel about its axis. The oscillation or shimmying is caused in part by offset load impacts on the wheels, such as can occur when the side of the dolly wheel surface that engages the road contacts resistance, stones or bumps, which cause the wheel to rotate and then recenter when the trailing dolly effect again becomes the controlling directional force on the wheel. In rapidly recentering, the wheel typically goes past center and then must recenter back again. The rapid effect of this phenomenon sets up an ongoing shimmy or oscillation which is disruptive to the smooth operation of the vehicle.

As the speed of the vehicle increases, the need for rapid response of the dolly wheels and full rotation of the dolly wheels is lessened. At higher speeds, as discussed, however, road impacts to the dolly wheels can excite oscillation and instability of the dolly wheel axles. It would therefore be desirable to provide a dolly wheel system which resists the dynamic excitation caused by use of the dolly wheels at high speed.

As is known, with dolly wheel steering systems the front wheels follow the vehicle's motion direction as the vehicle rotation and hence, steering is normally provided by the drive axle. Such a system with drive axle steering utilizes free rotating dolly wheels that are configured to swivel 360 degrees with the trailing wheel center allowing for automatic alignment. In addition to instability at high speeds, this zero turn capability about the driven axis can cause instability when the vehicle encounters rough terrain with the free rotating dolly wheels providing no directional stability, which can result in loss of directional control. For example, because the dolly wheels respond to the unequal speeds of the drive wheels, undesired vehicle rotation and hence turning can result, such as when one drive wheel experiences slippage due to lack of traction or when the vehicle is driving along a side hill where the tires see unequal weight and thus unequal traction, or a side hill where the vehicle weight over the dolly wheel wants to pull that end downhill, whereas a steered tire would hold the desired vehicle path. At slower speeds and in normal conditions, however, the dolly wheels are required to have complete freedom to follow the drive wheel turn requirements.

Presently, various methods and designs have been developed to reduce these problem of shimmying and oscillating. Some of these designs have used hydraulic braking devices and friction devices in order to restrain movement of the dolly wheels regardless of the speed of the vehicle. Moreover, some of these hydraulic brakes operate only at certain positions of the dolly wheels and others operate for the entire 360 degrees of rotation of the dolly wheel axle. They are thus constrained by when they can be deployed. Moreover, these systems only attempt to prevent shimmying at high speeds.

Presently, there are no known systems that provide direct steering control over dolly wheels on a vehicle at any speed. This is because to do so would eliminate benefits that accompany dolly wheel steering. Thus, it would be desirable to provide a dolly wheel system that can be fully controlled without losing the maneuverability provided by dolly wheels.

SUMMARY OF THE INVENTION

It is therefore an object of the present invention to provide a dual mode steering system for a dolly wheel that provides varying dampening of the dolly wheel when in the free rotation mode for advantages in reduced shimmy and oscillation and stability in conditions leading to the need for full controlled steering.

It is therefore also an object of the present invention to provide a dual mode steering system for a dolly wheel that provides direct steering control at higher speeds or uneven traction condition for vehicle stability and yet maintains the advantages of free rotating dolly wheel maneuverability at low speeds.

It is another object of the present invention to provide a dual mode steering system for a dolly wheel that restricts the free rotation of the pivot axis in relation to speed or uneven traction of the vehicle employing the dolly wheel when the dolly wheel is to be steered either manually or automatically.

It is a further object of the present invention to provide a dual mode steering system that allows for steering control of a dolly wheel within a certain predetermined steering range and allows for normal dolly wheel operation outside of the predetermined steering range.

It is still another object of the present invention to provide a dual mode steering system that provides for steering control of a dolly wheel upon demand.

It is still another object of the present invention to provide a steering system with the ability to provide complete steering control capability which simulates dolly wheel steering in order to provide the advantages of dolly wheel steering and full control steering.

It is still a further object of the present invention to provide a steering system or dual mode steering that can be incorporated into a mobility vehicle such as, but not limited to a personal mobility vehicle, a utility vehicle, a trailed device or an automobile.

It is yet another object of the present invention to provide a dual mode steering system that allows a steering control over dolly wheel when a vehicle is being parked, when a vehicle is being maneuvered on a hillside or tight locations, and when a vehicle is operated in conditions of lessened steering control due to drive wheel slippage.

In accordance with the above and the other objects of the present invention, a dual mode dolly wheel steering system is provided. The dolly wheel system includes a dolly wheel, a dolly wheel spindle assembly in communication with the dolly wheel, such that the dolly wheel and the dolly wheel spindle are fixedly secured to one another and are rotatable as a single unit. The dolly wheel spindle is in communication with a dampening and/or coupling device and a steering control system. The steering control system and the dampening device are each in communication with a controller to regulate actuation of each. When a signal from the controller requests utilization of steering control, the dampening and/or coupling device applies a restraining force to the dolly wheel spindle to limit rotation of the dolly wheel. When the rotation of the dolly wheel spindle is restrained relative to the steering control system, the steering control system can effectuate direct steering control of the dolly wheels to provide precise directional control. It is understood that dolly wheel position sensors that detect the position of the wheel relative to the vehicle axis of travel and the orientation requested by the steering input can define movement of the dolly wheel to effectuate desired controlled steering. Conversely, when the control indicates that the normal dolly wheel capability is desired, the restraining force applied to the dolly wheel spindle by the dampening device is relieved and the steering control system is overridden. By the then free relationship of the dolly wheel to the steering control system, a level of dampening may be maintained to resist shimmy and oscillation.

The dampening device may be comprised of an electro-viscous fluid in combination with the corresponding contours of the spindle shaft and surrounding chamber, which is in communication with the controller to result in a varying resistance to restrict motion of the dolly wheel.

The dampening device may be comprised of an electric motor, a hydraulic pump/motor, or a mechanical détente system each of which is in communication with the controller to result in a resistance to restrict motion of the dolly wheel.

The steering control system may be comprised of a hydraulic, electric, pneumatic, or mechanical powered steering input which is in communication with the controller to provide the ability for corrective steering when demanded or for corrective steering in the forward speed vehicle operation.

Other objects and features of the present invention will become apparent when viewed in light of the detailed description of the preferred embodiment when taken in conjunction with the attached drawings and appended claims.

BRIEF DESCRIPTION OF THE DRAWING

FIG. 1 is a top view of a dual mode dolly wheel steering system in accordance with a preferred embodiment of the present invention;

FIG. 2 is a partial cross-sectional side view of a dual mode dolly wheel steering system in accordance with a preferred embodiment of the present invention;

FIG. 10 is a perspective view of a mobility vehicle utilizing a dolly wheel system in accordance with a preferred embodiment of the present invention.

DETAILED DESCRIPTION OF THE PREFERRED EMBODIMENT

Figure 3:
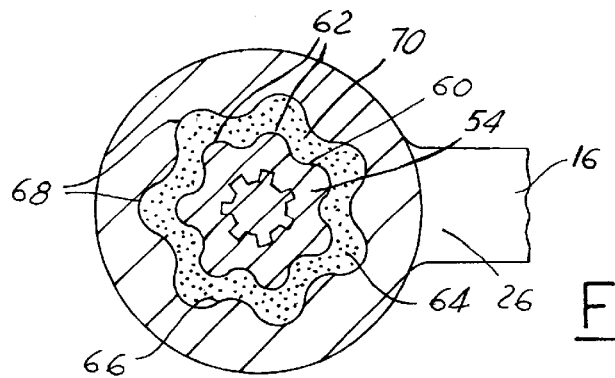
FIG. 3 is a cross-sectional view of a dampening device for a dual mode dolly wheel steering system in the direction of the arrows 3—3 in FIG. 4.

Referring now to FIGS. 1 and 2, which illustrate a dolly wheel assembly 10 in accordance with the present invention. The dolly wheel assembly 10 includes a dolly wheel 12, a dolly wheel mounting member 14 with a dolly wheel spindle 18 attached thereon, and a support member 16 for the complete dolly wheel assembly 10. The dolly wheel 12 is preferably a free rotating wheel that is capable of rotating or swiveling 360 degrees with respect to an axis 20 defined by the dolly wheel spindle 18. The free rotating capability allows the dolly wheel to turn quickly and to be turned to a variety of different positions. In the preferred application, a pair of dolly wheel assemblies 10 are mounted to a front of a vehicle or other structure, as shown illustratively in FIG. 10. By utilizing dolly wheels for this application, this allows the vehicle to have advantageous maneuverability, referred to by those skilled in the art as zero turn steering capability.

As shown, the dolly wheel mounting member 14 includes a pair of downwardly extending flange portions 22 and may include an upper portion 24. The dolly wheel 12 is secured to the dolly wheel mounting member 14 by a shaft 21 that passes through each of the flange portions 22 and the center of the dolly wheel 12. The dolly wheel 12 is secured to the dolly wheel mounting member 14 by the shaft 21 such that the dolly wheel 12 can freely rotate radially in either a forward or rearward direction. While a pair of flange portions 22 are preferably utilized to secure the dolly wheel 12, it will be understood that only a single flange portion may also be utilized with the shaft 21 rigidly projected off of it to effectuate the axle. The mounting member 14 and the flange portions 22 can take on a variety of other configurations.

The dolly wheel spindle 18 is preferably secured to the upper portion 24 of the dolly wheel mounting member 14. Thus, as the dolly wheel 12 rotates with respect to the axis 20, the dolly wheel spindle 18 similarly rotates. The dolly wheel spindle 18 is rotationally secured through a bearing device 30 to the support member 16 at an outer end 26, such that the dolly wheel spindle 18 and the associated dolly wheel 12 can rotate in an axial direction with respect thereto. The support member 16 has an inner end 28 that is secured to a suspension system of a vehicle or other vehicle frame structure.

The dolly wheel spindle 18 while supported by the bearing device 30 is preferably in communication with a dual mode steering system 32 for a dolly wheel 12 to provide both conventional dolly wheel capabilities and precise directional control as desired. The dual mode steering system 32 also includes a coupling device 34, which can regulate the free rotation of the pivot axis. As will be understood from the discussion below, the coupling device 34 can work on demand through a controller 36 to partially or fully dampen or clamp the dolly wheel spindle 18 for system stability as required by the systems signal related the vehicle speed and variabilities of traction or terrain. For example, the coupling or dampening device can be utilized at high speeds to prevent oscillation or shimmying or can be utilized when the steering controls are within a certain predetermined range, as will be understood by one of skill in the art.

It will be understood that the coupling illustrated generally by reference number 34 can be achieved by a mechanical, hydraulic, electrohydraulic or electrically actuated détente system, a viscous dampener, or a dampener device of hydraulic or electrical means that provides varying resistance of the dolly wheel spindle 18 to rotation about the axis 20. Various embodiments of the dolly wheel system 10 employing a coupling device are described in detail below with reference to the drawings. The coupling device can also act as a dampening device to provide varying degrees of restrictive force as is described in more detail in co-pending U.S. application Ser. No. 10/156,466, entitled "Dampening For A Dolly Wheel System," filed concurrently herewith and which is hereby incorporated by reference. Alternatively, the coupling device can apply a locking force to prevent rotation of the dolly wheel 12.

The dual mode steering system 32 also includes steering controls 38 that are in communication with either direct manual control or the controller 36, which enables an actuator to provide precise directional control over the dolly wheel 12. As shown in FIG. 2, the coupling device is an electric actuated mechanical brake 40 that upon receiving a signal from the controller 36 applies a braking force to a disc 42 which is fixedly secured to the dolly wheel spindle 18. This braking force thus prevents the dolly wheel spindle 18 from rotating and thus the dolly wheel 12 from freely rotating about the axis 20. When the mechanical brake 40 is applying a force to the disc 42 to restrict movement of the dolly wheel 12, as determined by the controller 36, the steering controls 38 can be utilized to effectuate direct control over the movement of the dolly wheel 12.

Once the dolly wheel spindle 18 is coupled or locked up, the dolly wheel 12 can be steered by a conventional tie rod 44, which is secured at one end to the dolly wheel spindle housing 46 by a securing means 47, such as a ball joint end or the like. Thus, movement of the tie rod 44 would cause the dolly wheel spindle housing 46 to rotate about a king pin 48. The king pin 48 is intended to rotate around the pivot axis 50 to effectuate steering of the dolly wheel 12. The pivot axis 50 is separate and removed from the rotational axis 20 of the dolly wheel. In this embodiment, it is understood that the axis 50 may have caster and chamber angles independent of the axis 20 utilized by the dolly wheel operating in the free mode. It is understood that the tie rod 44 may also be a hydraulic cylinder, an electric actuator, or other control means.

Figure 4:
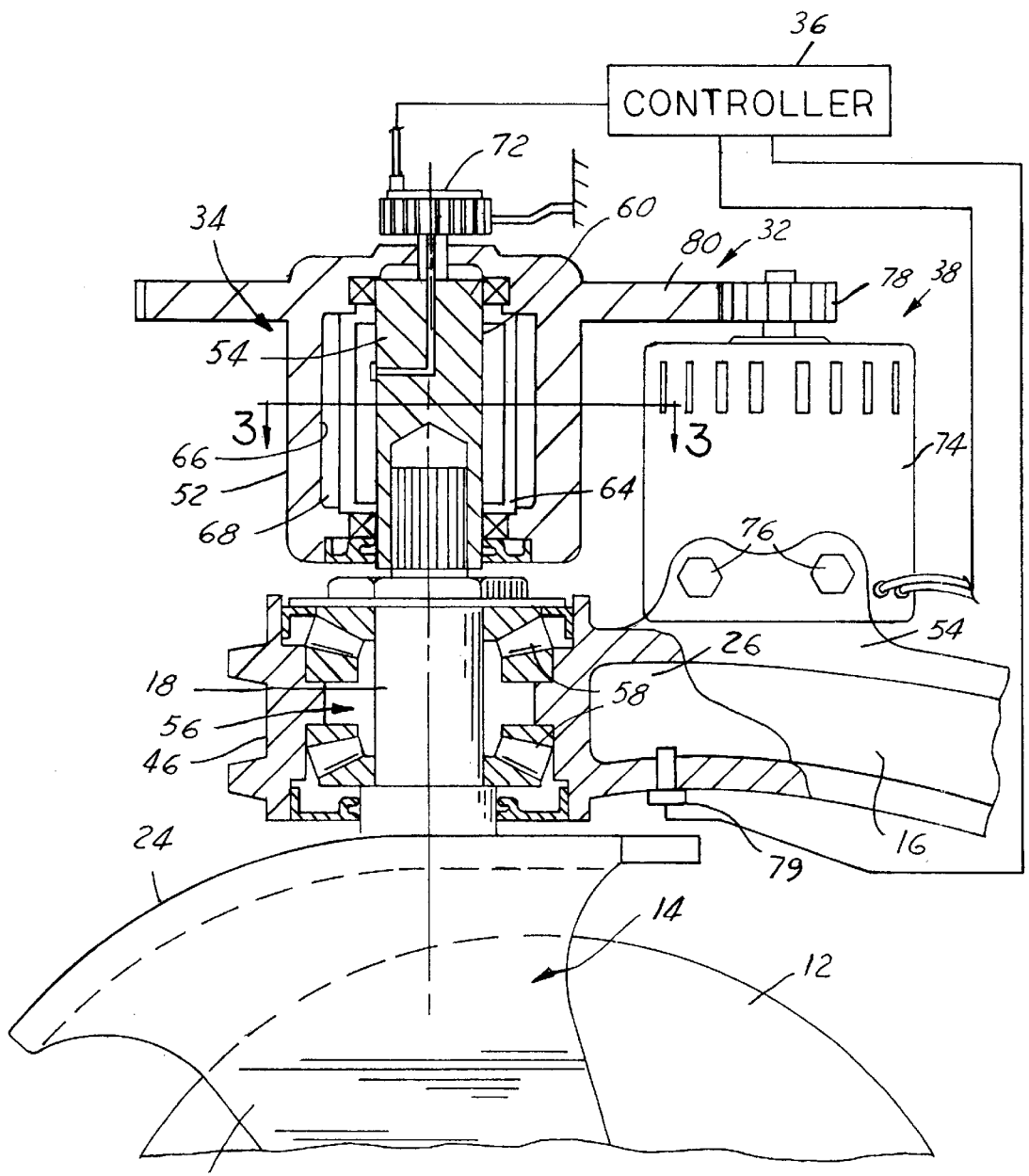
FIG. 4 is a partial cross-sectional side view of a dual mode dolly wheel steering system in accordance with another preferred embodiment of the present invention.

FIGS. 3 and 4 illustrate another embodiment of a dual mode dolly wheel steering system 32 in accordance with the present invention. The dual mode system 32 includes a coupling device 34, which is preferably secured relative to the dolly wheel support member 16. In this embodiment, the coupling device 34 is located in its own coupler housing 52 that is disposed above the dolly wheel spindle housing 46.

The coupler housing 52 has a cylindrical post 54 disposed therein which is secured to the dolly wheel spindle 18. The dolly wheel spindle 18 is located in the dolly wheel spindle housing 46 and is secured to the upper portion 24. The dolly wheel spindle 18 is supported on a bearing assembly 56 including a pair of bearings 58 that allows it to rotate.

As shown best in FIG. 3, the outer surface 60 of the cylindrical post 54 includes a plurality of radial ribs 62 formed thereon and which extend generally outwardly. While radial ribs 62 are preferably utilized, a variety of other protruding structures or surface contours may be utilized. A chamber 64 is defined between the outer surface 60 of the cylindrical post 54 and an inner surface 66 of the coupler housing 52. The inner surface 66 of the coupler housing 52 also preferably has a plurality of radial grooves 68 formed therein. While radial grooves 68 are preferably utilized, a variety of other structures or surface contours may also be utilized. It will be understood that the dampening effect of the plurality of radial grooves 68 in concert with the plurality of radial ribs 62 and the varying viscosity fluid could be effectuated with similarly employed radial pins or other non-contact surface contours on the post 54 and the coupler housing 52. The coupling device 34 is also in communication with a controller 36, which controls the application of the current to excite the viscous fluid medium 70, such as through a current contact 72.

In accordance with the present invention, an electrically excited viscous fluid medium 70 is located within the chamber 64. The viscous fluid medium is referred to by those skilled in the art, as magnetorheological (MR) fluid technology that when excited at times and in magnitude determined by the controller 36, by an electrical current, increases the effective viscosity of the fluid. However, it will be understood that other fluids of similar characteristics may be utilized. When current is applied to the chamber 64 to excite the fluid medium 70 as regulated by the controller 36, such as from a current source located within the vehicle, the fluid medium 70 becomes more viscous up to and including a semi-solid state. The increased viscosity of the medium 70, together with the radial ribs 62 and the radial grooves 68 cause resistant and dampened pivot response of the dolly wheel 12 about the axis 20. Thus, in the most viscous semi-solid state of the fluid 70, the coupling device 34 prevents the dolly wheel 12 from rotating about the axis 20. Since the dolly wheel spindle 18 is restrained by the motor 74, rotation of the dolly wheel 12 is restricted, and the system thus reduces undesired oscillation or rotation.

The dampening device 34 is preferably on demand such that it can fully clamp or variably dampen the dolly wheel 12 as desired by an operator or as automatically controlled to respond to requirements for certain speed, traction, and terrain conditions. It is understood that the requirements could be directed by sensing devices on the vehicle, which can sense factors indicative of the requirements and input these signals to the controller 36. For example, the vehicle can include an electronic speed sensor in communication with the drive system. When the sensor senses that the vehicle speed is rising above a certain level, a signal will be sent for electronic proportional actuation of the dampening device to apply a restricting force to the rotation of the dolly wheel spindle 18. In the case of a differential traction of the drive wheels of the vehicle, or in response to a signal of side slope greater than a preset level, a full clamping force could be applied. Moreover, feedback to the system is preferably provided such that the amount of viscous dampening force being applied can also be sensed by an electronic sensor and provided in communication with the controller 36. Each of the dolly wheels 12 of a vehicle can be clamped individually or collectively.

Some other examples of when the disclosed system can be utilized include for parking a vehicle on a hillside, maneuvering on a hillside, maneuvering in tight locations, or operating in conditions of lessened control or drive wheel slippage. Moreover, the coupling device 34 can be actuated directly. A principal benefit of the disclosed system is that the coupling device 34 can automatically and accurately engage in a desired relationship for vehicle travel stability. Additionally, another benefit is that the dampened steering at higher speeds reduces the likelihood of vehicle turning occurring at an unsafe rate. It will also be understood that the controller 36 could be designed to provide two or more modes of control with differing dolly wheel dampening relationships to accommodate an operator's desires related to vehicle use based on speed, terrain demands, style of driving, and traction conditions.

The dual mode steering system 32 also includes a motor 74, which is utilized in connection with the coupling device 34. Thus, once the coupling device 34 has been actuated by the controller 36 to lock up the dolly wheel spindle 18 to prevent it from free rotation, the motor 74 can be utilized to turn steer the dolly wheel 12. The motor 74, which can be either hydraulic, electric, or mechanical, is secured to the support arm 16 by one or more securing means 76. The motor 74 is in communication with a pinion gear 78, which meshes with and drives a gear 80. The gear 80 is in communication with the cylindrical post 54 through coupling housing 82 and its locked coupling relative to the cylindrical post 54 to allow the dolly wheel 12 to be steered by an operator as desired when the coupling device 34 is in a locked mode position. The wheel position sensor 79 senses the relative position of the dolly wheel 12 to that of the axis of vehicle travel and requested steering at that point in time in order to actuate the driving motor 74 and hence bring the dolly wheel 12 to its proper rotational position.

Figure 5:
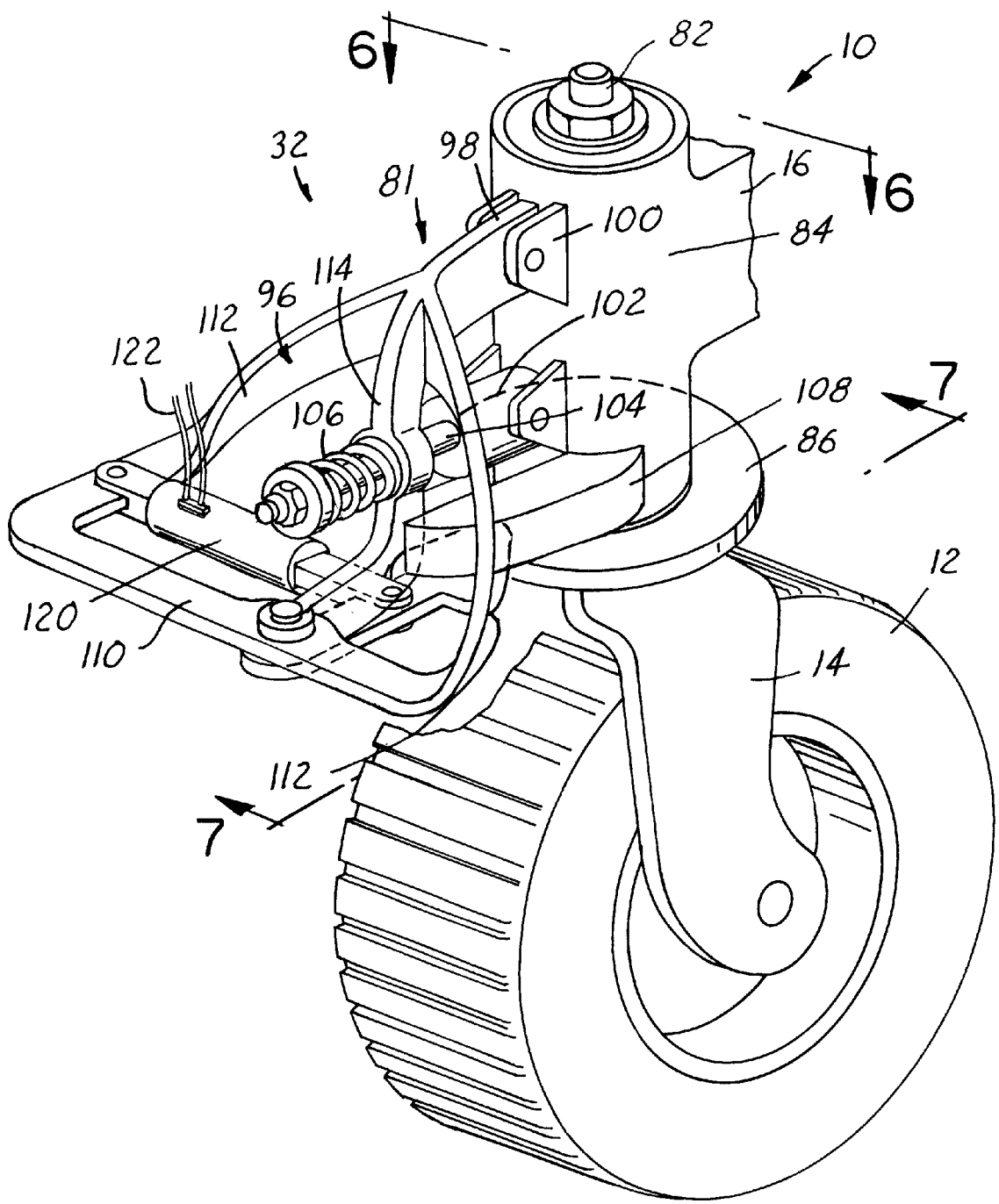
FIG. 5 is perspective view of a dual mode dolly wheel steering system in accordance with still another preferred embodiment of the present invention.
Figure 6:
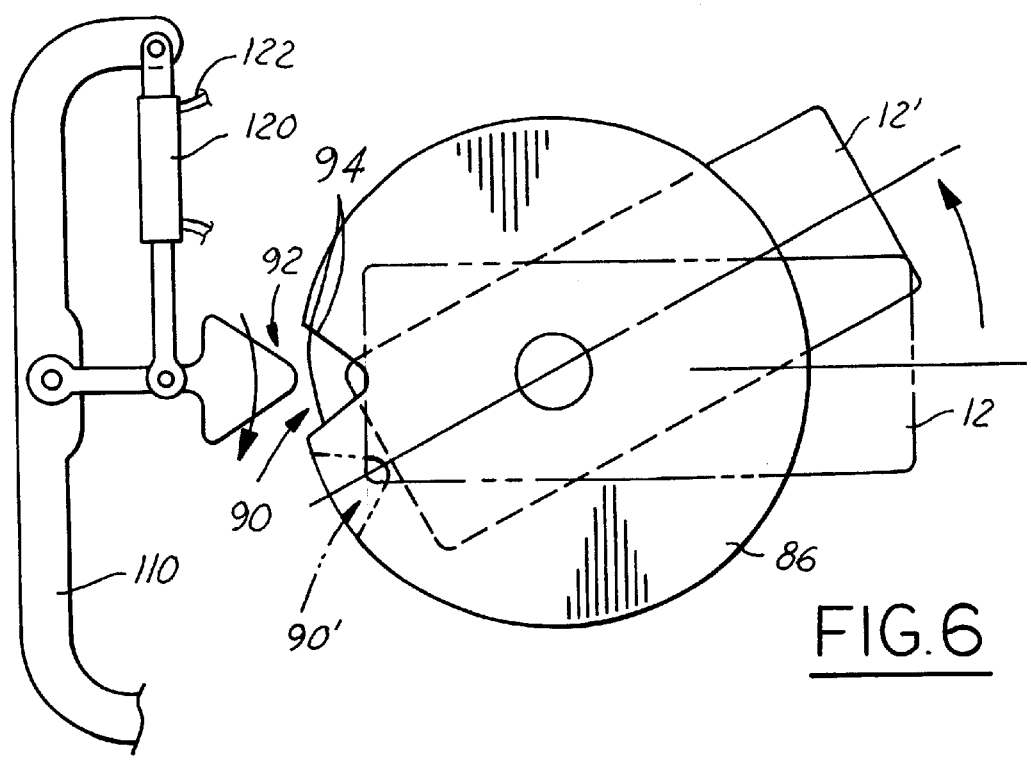
FIG. 6 is a top view of the dual mode dolly wheel steering system in the direction of the arrows 6—6 in FIG. 5 with parts removed for purposes of clarity.
Figure 7:
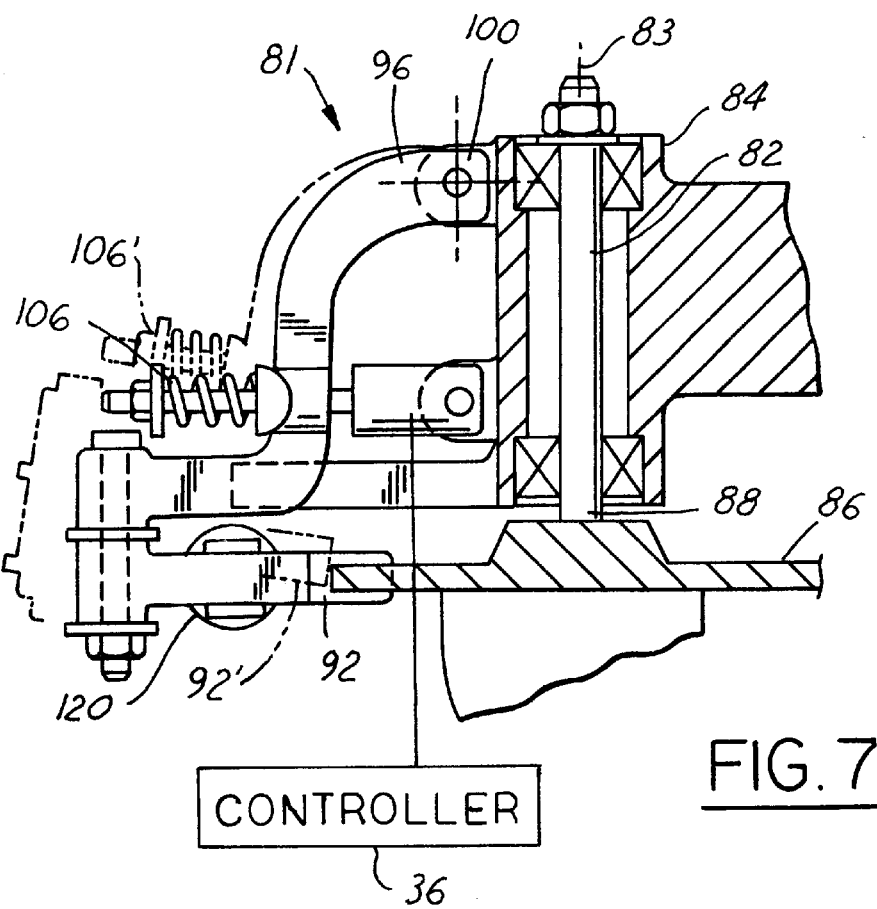
FIG. 7 is partial cross-sectional side view of the dual mode dolly wheel steering system in the direction of the arrows 7—7 in FIG. 5.

FIGS. 5 through 7 illustrate another embodiment of a dual mode steering system 32 for use with a dolly wheel assembly 10 in accordance with the present invention. The dual mode steering system 32 includes a coupling device 34, which in this embodiment is a mechanical détente system 81. The mechanical détente system 81 is in communication with the dolly wheel spindle 82 to regulate free rotation about the pivot axis 83. As will be understood, the mechanical détente system 81 can work on demand to partially or fully clamp the dolly wheel spindle 82.

The mechanical détente system 81 includes a coupling housing 84 that houses the dolly wheel spindle 82. The dolly wheel spindle 82 has a disc 86 fixedly secured to a bottom end 88 thereof such that the disc 86 rotates as the dolly wheel 12 and the dolly wheel spindle 82 rotate. The disc 86 has a notch 90 formed therein. The notch 90 is positioned such that it will receive a détente latch 92 therein when the dolly wheel 12 is oriented in a forward facing position. However, the notch 90' is oriented as shown in phantom when the dolly wheel 12' is oriented as shown in phantom. The notch 90 is generally "v" shaped with a pair of inwardly sloping surfaces 94 that help pull the détente latch 92 into secure engagement with the disc 86 to prevent rotation of the dolly wheel 12.

The détente latch 92 is pivotally disposed at the end of a détente arm 96. The détente arm 96 is rotatably secured an its upper end 98 to the upper pivot 100 of the coupling housing 84. The détente arm 96 is in communication with an actuator 102. The actuator 102 has a linearly reciprocating shaft 104 that moves the détente arm 96 outwardly to disengage the détente latch 92 from the notch 90 and moves the détente arm 96 inwardly and into engagement with the notch 90. The sloping surfaces 94 assist in allowing the détente latch 92 to fully rest in the notch 90. The actuator 102 is in communication with the controller 36 to cause the shaft 104 to reciprocate correspondingly with desired détente actuation relative to vehicle operation.

As shown in FIG. 7, the shaft 104 can be moved to fully lock the dolly wheel 12 with the détente latch 92 in full engagement with the notch 90. The shaft 104 can also be moved to a fully extended position where the détente arm 96 is pivoted about the upper pivot 100 such that the dolly wheel 12 has unrestricted movement, as generally illustrated in phantom. The détente arm 96 is in communication with a spring 106. The spring 106 is an override spring, which can override the actuator 102 and the position of its shaft 104 to cause the détente latch 92 to disengage the notch 90 as desired. For example, the spring 106 can allow override when there is a sudden demand for steering beyond that normal to corrective steering when at high speed, such as steering for sudden obstacle avoidance. The coupling housing 84 also preferably has a pair of guide flanges 108, which are intended to locate the détente latch 92 with respect to the notch 90.

The détente arm 96 includes a horizontal bar 110, a pair of generally upwardly extending side supports 112, and a middle bar 114 which is in direct communication with the spring 106. A steering actuator 120 preferably extends between one of the pair of extending side supports 112 and the pivoting détente latch 92. The steering actuator 120 is in electrical communication with the controller 36 through an input, as generally indicated by line 122, when the steering actuator 120 is an electric actuator. In the case of the steering actuator 120 being hydraulic, input line 122 would denote hydraulic control lines, with flow provided by a system in communication with the controller 36. It is understood that the steering actuator 120 could instead be a mechanical system. The powered steering input 122 may be in communication with an electrical, hydraulic, pneumatic or mechanical source. When the détente latch 92 is engaged, the powered steering input 122, through the communicative source, allows the dolly wheel 12 to be directly controlled to provide precise directional control at high speeds, when traveling on uneven terrain or under other suitable circumstances.

Figure 8:
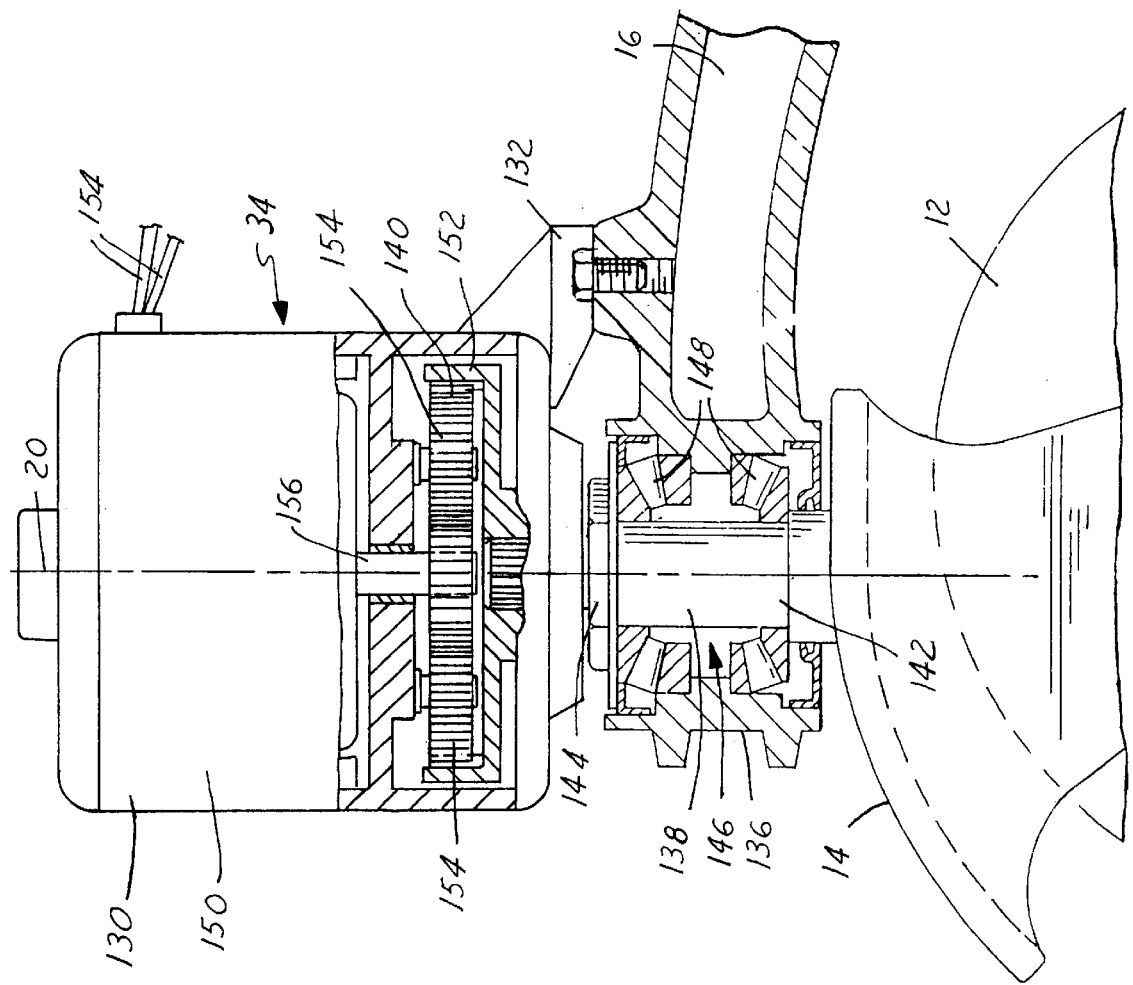
FIG. 8 is a partial cross-sectional side view of a dual mode dolly wheel steering system in accordance with still another preferred embodiment of the present invention.
Figure 9:
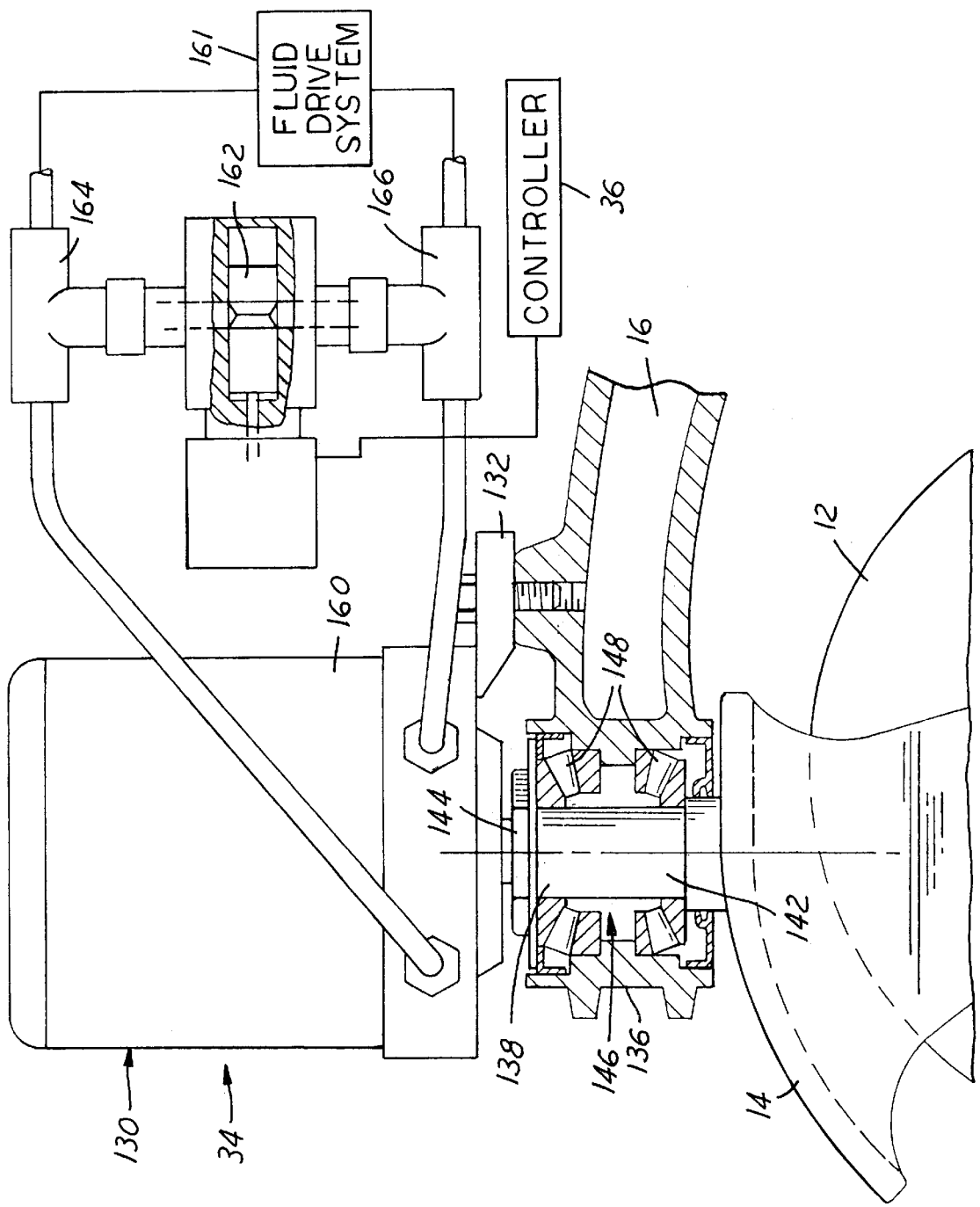
FIG. 9 is a partial cross-sectional side view of a dual mode dolly wheel steering system in accordance with yet another preferred embodiment of the present invention.

Referring now FIGS. 8 and 9, which illustrate alternate embodiments of a dual mode steering system 32 in accordance with the present invention. In each embodiment, the coupling device 34, which differs as is discussed in more detail below, is located in a coupler housing 130. The coupler housing 130 includes a support attachment arm 132, which is secured to the support member 16. The coupler housing 130 is preferably disposed on top of a spindle housing 136. The spindle housing 136 has a dolly wheel spindle 138 located therein. The dolly wheel spindle 138 is secured to the mounting member 14 at a lower end 142 and is in communication with the coupler housing 130 at an upper end 144. The dolly wheel spindle 138 is supported on a bearing assembly 146 including a pair of bearings 148 that allow it to rotate.

In the embodiment shown in FIG. 8, the coupling device 34 is used for the same purposes described above, namely to restrict movement of the dolly wheel 12 about its axis 20 upon demand as regulated by the controller 36. The coupling device is preferably an electric motor 150 which is in communication with the dolly wheel spindle 138 through a planetary gear 152 system which is restrained by housing 130. The electric motor 150 is preferably in communication with the controller 36 by wires 154. In an unexcited mode of the electric motor 150, the dolly wheel spindle 118 can free wheel allowing full 360 degree rotation of the dolly wheel 12.

In the excited mode, the controller 36 signals the electric motor 150 to start applying a restrictive force to the dolly wheel spindle 138 through the planetary gear 140. It will be understood that the electric motor 150 can be powered to provide a dampened braking force to the dolly wheel spindle 138 and thus the dolly wheel 12. The electric motor 150 can also be powered to provide rotation of the dolly wheel spindle 138. In this mode, the motor 150 applies a full locking force to the dolly wheel spindle. In this steering mode with the electric motor 150 providing rotation, the dolly wheel spindle 138 is rotated through communication with a driven ring gear 152. The ring gear 152 is in communication with the planetary gears 154 driven by the electric motor 150 to effectuate steering. The dolly wheel 12 is steered in the opposite direction as the shaft 156, which is rotated by the electric motor 150. With the planetary gear reduction, this provides precise directional control over the dolly wheel 12 either automatically or manually on demand.

In the embodiment shown in FIG. 9, the coupling device 34 is used for the same purposes described above, namely to restrict movement of the dolly wheel 12 about its axis 20 as desired by the controller 36. The coupler housing 130 includes a support attachment arm 132, which is secured to the support member 16. The coupling device is preferably a hydraulic pump/motor 160 which is in communication with the dolly wheel spindle 138 to apply a resistive or braking force thereto as regulated by flow or lack thereof of a drive system 161 in coordinated operation with the flow valve 162, both of which are controlled by the controller 36. The pump/motor 160 can be a vane pump, a piston pump, or a gear pump motor with appropriate controls to accommodate pump/motor characteristics. Obviously, other pump/motors can be utilized.

The pump/motor 160 is preferably in fluid communication with a valve 162 which effects control of flow which allows or resists rotation of the dolly wheel spindle 138. The valve 162 is preferably electric controlled, but other valves may obviously be utilized. The valve 162 preferably has an open position, variable metered positions, and a closed position. When the valve 162 is in the open position, no force resists the dolly wheel spindle 138 and the dolly wheel can thus rotate throughout its 360 degrees while pumping fluid freely through the open valve 162. When the valve 162 is closed, the total restriction of flow locks up the pump/motor 160 such that the dolly wheel spindle 138 is locked. When the valve 162 is partially restricted, a greater rotating force is required to pump fluid through the valve 162, thus providing a dampened effect on the rotation of the spindle 138.

Once the valve 162 is in the locked position, and the flow of the fluid drive system 161 is closed, i.e., no fluid is flowing in the passages 164, 166, the dolly wheel spindle 138 is locked or prevented from rotating. To effectuate rotation of the dolly wheel spindle 138 and thus the dolly wheel 12, one direction of flow of the fluid drive system 161 is activated to provide flow into the passage 164 and out of the passage 166, or vice versa for opposite direction of rotation. The fluid drive system 16 pumps fluid through the passage 164 to turn the dolly wheel 12 in one direction and through the passage 166 to turn the dolly wheel 12 in the other direction. The controller 36 is in communication with the valve 162 during controlled steering to effectuate a closed state for the valve 162.

The dampening system is preferably utilized in connection with dolly wheels, however it will be understood that it could be utilized for a variety of other applications. Moreover, the dampening system is preferably utilized on a pair of dolly wheels, which are incorporated into a vehicle. Preferably, the dolly wheels are utilized on a mobility vehicle 170, as shown in FIG. 10, but they could obviously be used on any type of driven vehicle or trailed device. Moreover, they can be located forwardly or rearwardly of the drive axle and less than or more than two dolly wheels may be utilized.

While a preferred embodiment of the present invention has been described so as to enable one skilled in the art to practice the present invention, it is to be understood that variations and modifications may be employed without departing from the purview and intent of the present invention, as defined in the following claims. Accordingly, the preceding description is intended to be exemplary and should not be used to limit the scope of the invention. The scope of the invention should be determined only by reference to the following claims.

In the claims:

1. A dolly wheel steering system, comprising:
   a dolly wheel;
   a dolly wheel spindle assembly fixedly secured to said dolly wheel such that said dolly wheel and said dolly wheel spindle are rotatable as a single unit about an axis of rotation;
   a dampening device in communication with said dolly wheel spindle to apply a variable restricting force to said dolly wheel spindle to limit free rotation of said dolly wheel spindle;
   a controller for directing said dampening device to restrict rotation of said dolly wheel; and
   a steering control device for effectuating direct steering of said dolly wheel when said dampening device has fully restricted free rotation of said dolly wheel.

2. The assembly of claim 1, wherein said dampening device can be employed by said controller to apply said variable restricting force to said dolly wheel spindle to reduce shimmying or oscillation of said dolly wheel at high speeds.

3. The assembly of claim 1, wherein said dampening device can be employed by said controller to apply said variable restricting force to said dolly wheel spindle to reduce free rotation of said dolly wheel on a hillside.

4. The assembly of claim 1, wherein said dampening device can be employed by said controller to apply said variable restricting force to said dolly wheel spindle to reduce free rotation of said dolly wheel spindle in conditions of varying traction.

5. The assembly of claim 1, wherein said dampening device is an electroviscous dampener which includes an electroviscous fluid which upon application of a current from said controller varies the viscosity of said electroviscous fluid to dampen free rotation of said dolly wheel spindle about said axis of rotation.

6. The assembly of claim 5, wherein said electroviscous fluid is magnetorheological fluid technology.

7. The assembly of claim 1, wherein said dampening device is an electric motor having variable resistance of rotation, said electric motor being in communication with said controller for desired operation.

8. The assembly of claim 1, wherein said dampening device includes a hydraulic pump/motor system with a variable orifice for providing the ability to regulate variable resistance and dampen rotation of said dolly wheel spindle about said axis of rotation, said hydraulic pump/motor system being in communication with said controller for desired operation.

9. The assembly of claim 1, wherein said dampening device includes a hydraulic pump/motor system utilizing an electroviscous fluid for providing the ability to regulate variable resistance and dampen free rotation of said dolly wheel spindle about said axis of rotation, said electroviscous fluid in said hydraulic pump/motor being in communication with said controller for desired operation.

10. The assembly of claim 9, wherein said electroviscous fluid is magnetorheological fluid technology.

11. The assembly of claim 1, wherein said dampening device is an electrical actuated mechanical brake which is in communication with said controller for desired operation.

12. The assembly of claim 1, wherein the dolly wheel assembly is incorporated into a mobility vehicle.

13. The assembly of claim 1, wherein said steering control device is a tie rod that is manually or power operated to maneuver said dolly wheel when said dampening device is actuated to fully restrict free rotation of said dolly wheel spindle about said axis of rotation.

14. The assembly of claim 1, wherein said steering control device is a hydraulic cylinder that is manually or power operated to maneuver said dolly wheel about said axis of rotation when said coupling device is actuated.

15. The assembly of claim 1, wherein the dolly wheel assembly is incorporated into a trailed vehicle.

16. The assembly of claim 1, wherein said variety of different conditions include one or more of the following:
parking a vehicle on a hillside, maneuvering a vehicle on a hillside, maneuvering a vehicle in tight locations, operating a vehicle in conditions of varying traction resulting in lessened control, and operating a vehicle at speeds where directional stability is desired.

17. The assembly of claim 1, wherein said dampening device is a mechanical detent system, which is in communication with said controller for, desired operation.

18. The assembly of claim 17, wherein said mechanical detent system includes a detent arm which is attached to and pivotable with respect to a coupler housing and a detent latch which engages a notch formed in disc which is secured to said dolly wheel spindle.

19. The assembly of claim 18, wherein said detent latch engages said notch to variably restrict free rotation of said dolly wheel spindle.

20. The assembly of claim 19, wherein said actuator arm causes said detent latch to rotate said disc and said dolly wheel spindle.

21. The assembly of claim 1, wherein said steering control device is in communication with said controller to effectuate maneuvering of said dolly wheel.

22. The assembly of claim 21, wherein said steering control device is an electric motor in communication with said controller to effectuate steering of dolly wheel when said dolly wheel spindle is fully restricted from free rotation about said axis of rotation by said dampening device.

23. The assembly of claim 22, wherein said electric motor has a planetary gear system and fully restricts free rotation of said dolly wheel spindle and then effectuates steering of said dolly wheel.

24. The assembly of claim 21, wherein said steering control device is a hydraulic pump/motor in communication with a fluid drive system in communication with said controller to effectuate steering of said dolly wheel when said dolly wheel spindle is fully restricted from free rotation about said axis of rotation by said dampening device.

25. The assembly of claim 24, wherein said hydraulic pump/motor both fully restricts free rotation of said dolly wheel spindle and then effectuates steering of said dolly wheel.

26. The assembly of claim 25, wherein said hydraulic pump/motor is in communication with a fluid delivery system to effectuate maneuvering of said dolly wheel.

27. The assembly of claim 21, wherein said steering control device is a mechanical detent system in communication with an actuator in communication with said controller to effectuate steering of said dolly wheel when said dolly wheel spindle is fully restricted from free rotation about said axis of rotation by said dampening device.

28. The assembly of claim 27, wherein said mechanical detent system both fully restricts free rotation of said dolly wheel spindle and then effectuates steering of said dolly wheel.

29. A method for providing dolly wheel steering, comprising:
providing a dolly wheel;
fixedly securing a dolly wheel spindle assembly to said dolly wheel such that said dolly wheel spindle assembly and said dolly wheel are rotatable together as a single unit about an axis of rotation;
signaling a dampening device to apply a force to said dolly wheel spindle assembly to limit free rotation of said dolly wheel;
steering said dolly wheel based on a received steering input; and
directing release of said force applied to said dolly wheel spindle assembly by said dampening device to allow free rotation of said dolly wheel spindle assembly about said axis of rotation when normal dolly wheel capability is desired.

30. The method of claim 29, wherein said step of signaling said dampening device to limit free rotation of said dolly wheel spindle assembly includes applying a current to an electroviscous fluid to change its viscosity to a semi-solid state to restrict free rotation of said dolly wheel about said axis of rotation.

31. The method of claim 29, wherein said step of signaling said dampening device to limit free rotation of said dolly wheel spindle assembly includes mechanically limiting free rotation of said dolly wheel about said axis of rotation.

32. The method of claim 31, wherein said step of mechanically limiting rotation of said dolly wheel spindle includes applying a braking force to a disc fixedly secured to said dolly wheel spindle.

33. The method of claim 31, wherein said step of mechanically limiting rotation of said dolly wheel spindle assembly includes actuating a mechanical detent system having a detent latch which fixedly secures said dolly wheel spindle assembly to restrict free rotation thereof.

34. The method of claim 29, wherein said step of signaling said dampening device to limit free rotation of said dolly wheel spindle assembly includes electrically controlling said dolly wheel spindle through actuation of an electrical motor in communication with said dolly wheel spindle.

35. The method of claim 29, wherein said step of signaling said dampening device to limit rotation of said dolly wheel spindle assembly includes actuating restriction of a flow orifice.

36. The method of claim 35, wherein said step of signaling said dampening device to limit rotation of said dolly wheel spindle assembly includes applying varying the viscosity of an electroviscous fluid in a hydraulic/pump motor by applying a current to said fluid.

37. The method of claim 29, wherein said step of maneuvering said dolly wheel includes manually steering said dolly wheel through a tie bar.

38. The method of claim 29, wherein said step of maneuvering said dolly wheel is effectuated by the use of a controller.

39. The method of claim 38, wherein said controller sends a signal to an electric actuator to steer said dolly wheel.

40. The method of claim 38, wherein said controller sends a signal to a hydraulic cylinder to steer said dolly wheel.

41. The method of claim 38, wherein said controller sends a signal to an electric motor to steer said dolly wheel.

42. The method of claim 38, wherein said controller sends a signal to a fluid delivery system to actuate a hydraulic pump/motor to steer said dolly wheel.

* * * * *